April 28, 1931.  E. KJERP  1,802,562
FRONT WHEEL DRIVE
Filed April 4, 1930  2 Sheets-Sheet 1
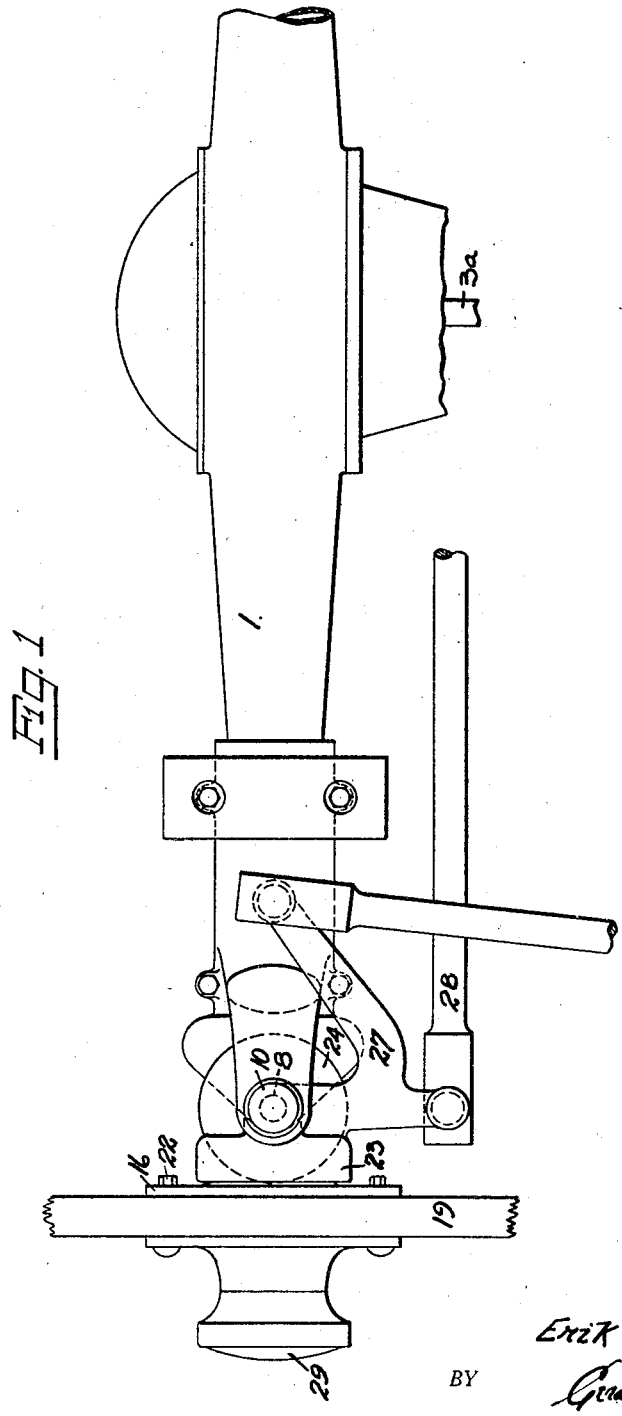
INVENTOR.
Erik Kjerp
BY
ATTORNEY.

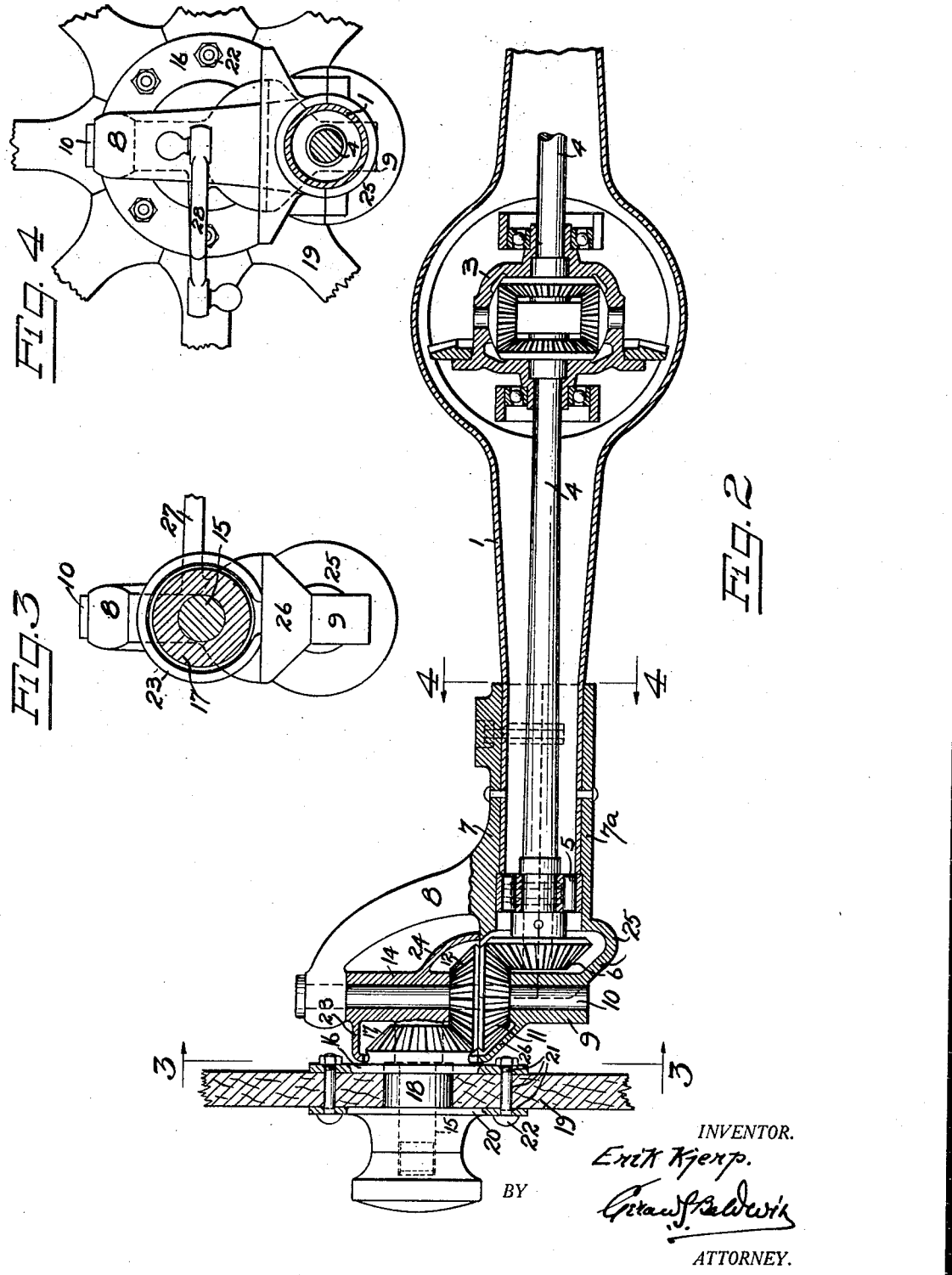

Patented Apr. 28, 1931

1,802,562

UNITED STATES PATENT OFFICE

ERIK KJERP, OF PONTIAC, MICHIGAN

FRONT-WHEEL DRIVE

Application filed April 4, 1930. Serial No. 441,507.

This invention relates to improvements in front wheel drives, and refers to a form of drive which may either be employed as the sole means of propulsion of a vehicle, or which may be utilized in conjunction with any rear wheel drive in cases where a four wheel drive is desired.

It is an object of the invention to provide a front wheel drive consisting of a hollow axle having a conventional differential therein and through which drive shafts extend, to arrange drive flanges pivotal about vertical axes, and to provide means for rotating the drive flange from the drive shafts irrespective of the horizontal inclination of the former relative to the latter.

Another object of the invention is to provide such a front wheel drive wherein the lateral distance between the drive flanges against which the wheels are secured and the vertical axes of the former is relatively short so that no undue gap occurs between the extremities of the axles and the adjacent sides of the wheels.

A further object of the invention is to provide a front wheel drive wherein conventional steering gear parts may be attached to the spindle yokes and the latter turned about their vertical axes in the usual manner.

Yet another object of the invention is to provide a front wheel drive which is simple and cheap to manufacture; wherein means are provided for simply attaching or removing a wheel therefrom; and wherein the operating parts are readily accessible.

With these and other objects and advantages in view which will become apparent as the specification proceeds, the invention is hereinafter more fully described with the aid of the accompanying drawings in which:

Figure 1 illustrates a partial plan view of the invention with a portion of the steering gear attached thereto.

Figure 2 is a partial side sectional view of the invention, and

Figures 3 and 4 are sections on the line 3—3 and 4—4 respectively of Figure 2.

Referring to the drawings, 1 designates a tubular axle substantially centrally of the length of which a conventional differential drive 3 is arranged which is driven from a main drive shaft 3a. Extending through the axle 1 in both directions are shafts 4 driven by the differential 3. As the axle 1 and driving mechanism from the outer extremities of the shafts 4 are identical at both ends of the axle only partial views are shown and the arrangement at one extremity only of the axle is described.

Adjacent its outer extremity the shaft 4 is supported by a bearing 5 mounted within the axle 1, and on the extremity of the said shaft and beyond the outer end of the axle a gear 6 is secured. Mounted around the outer extremity of the axle 1 is a two-piece sleeve 7 split longitudinally and having an axle yoke 8 integral with its upper portion. Integral with the lower portion 7a of the sleeve is an outwardly projecting vertical bearing 9. Extending through the yoke 8 and bearing 9 is a vertical pin 10. On the later two gears 11 and 12, which lie adjacent one another are rotatably mounted; and the lower gear 11 meshes with the gear 6 on rests adjacent the upper end of the bearing 9. The gears 11 and 12 are arranged to rotate together, and above the upper gear 12 a spindle yoke 14 is mounted on the pin 10. Extending horizontally outwards from, and integral with, the yoke 14 is a spindle 15. Rotatable mounted on the latter is a drive flange 16 having an inwardly projecting gear 17 thereon, which meshes with the gear 12. On the spindle 15 a hub 18 is rotatably arranged around which a wheel 19 is located. 20 indicates a hub plate integral with the hub 18, and the latter is held in position on the spindle 15 as by a cap 29. Through the hub plate 20, wheel 19 and drive flange 16 aligned apertures 21 are provided for the passage of fastening means such as bolts 22.

When the shaft 4 is turned the drive flange 16 is rotated through the gears 6, 11, 12 and 17. As the gears 12 and 17 are bevel gears, and as the axis of the gear 12 is also the axis about which the spindle 15 swings the drive flange 16 rotates with the shaft 4 when the said spindle is either in or out of alignment with the shaft 4.

Carried by the yoke 14 and preferably integral with it are guards 23 and 24 which protect the gears 17 and 12 respectively from water and dirt; and other guards 25 and 26 for the gears 6 and 11 are also carried by the lower sleeve portion 7a. Moreover the guard 25 also connects the lower sleeve portion 7a with its integral bearing 9.

Extending from the spindle yoke 14 at right angles to its axis is an arm 27 to which a conventional steering gear connection 28 is secured.

From the foregoing description it will be noted that I have not only devised a simple and efficient form of front wheel drive but also one wherein a relatively very small lateral gap occurs between the outer axle extremity and the adjacent side of the wheel thereby reducing the strains to which various parts are subjected and also providing a very compact structure.

While in the foregoing the preferred embodiment of the invention has been described and shown, it is understood that the construction is subject to such alterations and modifications as fall within the scope of the appended claim.

What I claim as my invention and desire to secure by Letters Patent is:

In a drive mechanism for automobiles, the combination of a hollow axle, a shaft extending therethrough and projecting beyond said axle, a gear on the outer extremity of said shaft, a yoke supported by said axle one extremity of which projects above and outwardly beyond said axle, a stationary pin the upper end of which is supported by said yoke extremity, a bearing integral with said axle supporting the lower extremity of said stationary pin, a spindle yoke rotatable on said pin, a spindle extending outwardly from said spindle yoke and integral with the latter, a drive plate rotatable on said spindle, a gear secured to the inner face of said plate and also rotatable on said spindle, two integral gears having upwardly and downwardly inclined teeth respectively rotatable on said pin, the lower of said integral gears meshing with the gear on said shaft, the upper of said gears meshing with the gear rotatable on said spindle, and a wheel hub secured to said drive plate.

ERIK KJERP.